United States Patent Office 3,196,537
Patented July 27, 1965

3,196,537
METHOD AND COMPOSITION FOR
WELDING CAST IRON
Robert H. Groman, East Moline, Ill., Joseph F. Quaas, Island Park, N.Y., and Rene D. Wasserman, Stamford, Conn., assignors to Eutectic Welding Alloys Corporation, Flushing, N.Y., a corporation of New York
No Drawing. Filed Feb. 17, 1960, Ser. No. 9,172
15 Claims. (Cl. 29—487)

This invention relates to a novel method and composition for joining two sections of cast iron or cast iron to steel, and it more particularly relates to a remarkably fast method for this purpose, and compositions for use in this method.

Prior to this invention, it was considered almost mandatory in welding cast iron to prevent the weldment from quickly cooling; and as recited on page 589 of the "Welding Handbook", third edition, copyright 1950, the following measures were recommended to accomplish this. It was recommended that the entire casting should be covered with an insulating material such as asbestos to prevent sudden chilling of the weld zone. Furthermore, for welds intended for severe service, the entire welded structure should be immediately stress relieved after welding by raising its temperature to 1100–1150° F., and holding it there for not less than one hour per inch of thickness after which, the cooling rate should not exceed 50° F. per hour until the weldment cooled to at least 700° F. These procedures are expensive and time-consuming, and even so, do not always prevent the cracking of initially deposited weld beads, which prevention is a prerequisite for a perfect joint.

An object of this invention is to provide a method and composition for rapidly welding cast iron which consistently provides great strength and minimizes the danger of cracking.

In accordance with this invention the portions of the cast iron or steel parent metal to be joined are grooved by a metal removing process which applies heat such as by utilization of a gouging or chamfering electrode. This increases and roughens the area to be welded, and it also superifically heats the localized areas to be joined. While these areas are still warm, a special weld metal composition is deposited upon the grooved areas of the joint. This composition must deposit metal having a total carbon content of not more than 1.0% in the undiluted form, and it must also bond strongly with cast iron and steel. High nickel content compositions are particularly effective for this purpose. Furthermore, the weld metal must be deposited by a spray type action to minimize penetration and heating of the parent metal. Immediately after each welding bead is deposited, it is quickly cooled, for example, by quenching in water; and this unexpectedly minimizes cracking and provides remarkably ductile and strong weldments.

The following are particular examples of this method and compositions for use in performing it which provide remarkably strong and ductile welds on cast iron or cast iron and steel. The surfaces of cast iron to be joined are first superifically heated, and surface roughened by utilizing a grooving electrode of the type described in U.S. Letters Patent No. 2,761,796, coated with an exothermic type coating. This treatment simultaneously superificially heats the surfaces to be joined and cuts grooves which increase the weld metal contact area. These grooves are, for example, cut upon the angular faces of the beveled edges of a conventionally prepared joint. After the surfaces to be joined are so prepared, they are placed adjacent each other, and an initial weld bead is deposited to join the two sections together. Particularly effective novel compositions for this purpose are later described. Immediately after each weld bead is deposited, the weld area is quickly cooled, for example, by quenching with an aqueous medium such as water or brine. The entire structure being welded can be qunenched; or if it is too large, a cloth saturated with the aqueous medium can be applied immediately to the joined area. This quenching anneals the weld metal providing remarkably high ductility and stress accommodation. As soon as the weld area stops steaming as a result of the aqueous quench, another bead can be deposited upon or adjacent the first bead. The aforementioned quick cooling operation is then immediately repeated after deposition of each successive bead.

For reasons which are not completely understood, residual stresses in the joined area are remarkably minimized, but it is speculated that this effect might result from the fact that the joined area is hastened through the critical period in contrast to the slow passage through it in accordance with normal techniques. This method has proven of extremely high value in repairing very many types of iron castings such as wheels, gears, housings, motor blocks and pumps.

An unexpectedly efficient type of composition for use in this method is prepared, for example, in the form of an electrode which deposits metal by a spray type transfer, of the type discussed in "Tentative Spec. for Mild Steel Arc Welding Electrodes," 1948, American Welding Society, ASTM A233–48T, AWS A5.1–48T, page 16, Part VIII. This type of arc action causes far less penetration and dilution of the parent metal than an electrode which operates with a globular type transfer, and it is provided by proper selection of core and coating materials to provide an electrode depositing metal at relatively low currents such as 60 to 130 amperes. One suitable alloy composition for use in this method is as set forth in the following:

| Constituent | Percent by weight | |
|---|---|---|
| | Range | Preferred Example |
| Nickel | 96.6–99 | Balance |
| Chromium | 0.20–1.0 | 0.53 |
| Manganese | 0.35–1.5 | 0.05 |
| Carbon | 0.40–0.90 | 0.80 |

This type of composition may be prepared in the form of a ⅛ inch diameter rod and deposited either in a bare or flux coated form.

In preparing a suitable coating for this core, an intimate mixture of the following ingredients in dry powdered form, as described in U.S. Letters Patent 2,471,803, is first prepared:

Pounds
Graphite _____ 16
Barium carbonate _____ 51½
Silicon (coarse) _____ 7½
Manganese dioxide _____ 10
Ferro-chrome alloy _____ 5
Ferro-silicon alloy _____ 5
Deoxidizing alloy _____ 5

The silicon powder employed has a particle size between 80 and 100 mesh. The deoxidizing alloy contains 40% iron, 20% aluminum, 20% manganese and 20% silicon.

A second intimate mixture is made of the following ingredients:

2-ethyl hexanol _____ounces__ 2
Aerosol, 25% _____do___ 1
Sodium silicate, 30° Baumé _____pounds__ 80

The first mixture is added to the second one and the whole is thoroughly mixed to form a smooth, semi-liquid paste. This constitutes a coating composition that may be applied to the aforementioned electrode in a customary manner. It produces exceptionally smooth, compact and evenly distributed coating of uniform thickness and without pin holes or other defects. This type of coating may also be prepared in accordance with the following ranges of constituents:

| Constituent: | Parts by weight |
|---|---|
| Graphite | 10–30 |
| Alkaline earth metal carbonates | 25–60 |
| Silicon metal powder (80 to 120 mesh) | 5–20 |
| Heavy metal oxides selected from the group consisting of manganese dioxide and both manganese dioxide and lead oxide | 2.5–25 |
| Deoxidizing ferro alloys | 3–30 | intimately admixed with a concentrated aqueous solution of an alkali-metal silicate, containing effective amounts of both a wetting agent and an anti-foaming agent, said solution being employed in an amount sufficient to impart to the coating composition from a creamy to pasty consistency.

An extremely effective electrode of this type may utilize a core of the aforementioned composition of a diameter of ⅛ inch to provide an electrode having a final diameter of 0.160 inch.

Another type of composition which is compatible with this method is a nickel-iron alloy of the following type:

| Constituent | Percent by Weight | |
|---|---|---|
|  | Range | Preferred Example |
| Nickel | 48–60 | Balance |
| Iron | 40–52 | 45 |
| Manganese | 0.35–1.5 | 0.50 |
| Carbon | 0.40–0.90 | 0.80 |

Still another effective composition is a Monel type as follows:

| Constituent | Percent by Weight | |
|---|---|---|
|  | Range | Preferred Example |
| Nickel | 58–65 | Balance |
| Copper | 35–42 | 38 |
| Manganese | 0.35–1.5 | 0.50 |
| Chromium | 0.40–0.90 | 0.80 |

All of the metal compositions mentioned herein can be used with the described coating formulation to provide an electrode which is highly effective in performing the described method. These compositions may also be deposited as a rod by means of a gas torch, with or without a suitable flux.

What is claimed is:

1. A method of welding cast iron which comprises the steps of applying intense concentrated heat to the portions of the parent metal to be joined for roughening and superficially heating them, abutting said superficially heated portions of said parent metal and depositing in a plurality of passes by a spray type transfer compatible weld metal, said weld metal having a total carbon content of not more than one percent in the undiluted form, upon the abutted superficially heated portions before said abutted superficially heated portions cool substantially, and immediately rapidly cooling said weld metal after each pass is deposited.

2. A method as set forth in claim 1 wherein said rapid cooling is accomplished by applying an aqueous medium to the weld area.

3. A method as set forth in claim 2 wherein said aqueous medium is applied by a quenching technique.

4. A method as set forth in claim 3 wherein successive weld passes are rapidly applied after each quench.

5. A method as set forth in claim 1 wherein said streams of heat are applied by a gouging electrode to groove said parent metal.

6. A method as set forth in claim 1 wherein said weld metal is a nickel content alloy.

7. A method as set forth in claim 6 wherein said weld metal is deposited from a rod having a composition consisting essentially of not less than 95% by weight of nickel, not more than 1.0% by weight of carbon, and the balance of alloying agents which are metallurgically compatible with cast iron and said composition.

8. A method as set forth in claim 7 wherein said balance includes suitable traces of manganese and chromium.

9. A method as set forth in claim 6 wherein said weld metal is deposited from a composition essentially consisting of the following constituents in the enumerated ranges of percentages by weight:

| Composition: | Range |
|---|---|
| Nickel | 96.6–99 |
| Chromium | 0.20–1.00 |
| Manganese | 0.35–1.50 |
| Carbon | 0.40–0.90 |

10. A method as set forth in claim 6 wherein said weld metal is deposited from a rod having a composition essentially consisting of the following constituents in the enumerated ranges of percentages by weight:

| Constituent: | Range |
|---|---|
| Nickel | 48–60 |
| Iron | 40–52 |
| Manganese | 0.35–1.50 |
| Carbon | 0.40–0.90 |

11. A method as set forth in claim 6 wherein said weld metal is deposited from a rod having a composition essentially consisting of the following composition in the enumerated ranges of percentages by weight:

| Constituent: | Range |
|---|---|
| Nickel | 58–65 |
| Copper | 35–42 |
| Manganese | 0.35–1.50 |
| Chromium | 0.40–0.90 |

12. An method as set forth in claim 6 wherein said weld metal is deposited from an electrode having a core essentially consisting of the following constituents in the enumerated ranges of percentages by weight:

| Constituents: | Range |
|---|---|
| Nickel | 96.6–99 |
| Chromium | 0.20–1.00 |
| Manganese | 0.35–1.50 |
| Carbon | 0.40–0.90 | said core being covered by a coating of the following constituents in the enumerated ranges of parts by weight:

| Constituent: | Range of parts by weight |
|---|---|
| Graphite | 10–30 |
| Alkaline earth metal carbonates | 25–60 |
| Silicon metal powder (80 to 120 mesh) | 5–20 |
| Heavy metal oxides selected from the group consisting of manganese dioxide and both manganese dioxide and lead oxide | 2.5–25 |
| Deoxiding ferro alloys | 3–30 | intimately admixed with a concentrated aqueous solution of an alkali-metal silicate, containing effective amounts of both a wetting agent and an anti-foaming agent, and said solution being employed in an amount sufficient to impart to the coating composition from a creamy to pasty consistency.

13. A composition for welding cast iron essentially consisting of the following constituents in the enumerated ranges of percentages by weight:

| Constituents: | Range |
|---|---|
| Nickel | 96.6–99 |
| Chromium | 0.20–1.00 |
| Manganese | 0.35–1.50 |
| Carbon | 0.40–0.90 |

14. An electrode for welding cast iron essentially consisting of a core made of the composition set forth in claim 13 covered by a coating of the following constituents in the enumerated ranges of parts by weight:

| Constituent: | Range of parts by weight |
|---|---|
| Graphite | 10–30 |
| Alkaline earth metal carbonates | 25–60 |
| Silicon metal powder (80 to 120 mesh) | 5–20 |
| Heavy metal oxides selected from the group consisting of manganese dioxide and both manganese dioxide and lead oxide | 2.5–25 |
| Deoxiding ferro alloys | 3–30 | intimately admixed with a concentrated aqueous solution of an alkali-metal silicate, containing effective amounts of both a wetting agent and an anti-foaming agent, said solution being employed in an amount sufficient to impart to the coating composition from a creamy to pasty consistency.

15. A composition for welding cast iron essentially consisting of the following constituents in the enumerated ranges of percentages by weight:

| Constituent: | Range |
|---|---|
| Nickel | 58–65 |
| Copper | 35–42 |
| Manganese | 0.35–1.50 |
| Chromium | 0.40–0.90 |

References Cited by the Examiner

UNITED STATES PATENTS

| 1,241,900 | 10/17 | Armstrong | 219—137 X |
| 1,274,395 | 8/18 | Driver. | |
| 1,580,662 | 4/26 | Girin. | |
| 1,803,467 | 5/31 | Driver et al. | 75—171 |
| 2,001,888 | 5/31 | Randolph | 75—171 |
| 2,354,267 | 7/44 | Lytle et al. | 29—487 |
| 2,363,828 | 11/44 | Anderson | 29—498 |
| 2,368,280 | 1/45 | Wilson et al. | 117—206 |
| 2,415,149 | 2/47 | Sjoman | 117—206 |
| 2,761,796 | 9/56 | Wasserman | 117—202 |
| 2,855,333 | 10/58 | Wasserman et al. | 117—206 |
| 2,862,294 | 12/58 | Phillip | 29—487 |

JOHN F. CAMPBELL, *Primary Examiner.*

JOSEPH B. SPENCER, *Examiner.*

UNITED STATES PATENT OFFICE
CERTIFICATE OF CORRECTION

Patent No. 3,196,537                      July 27, 1965

Robert H. Groman et al.

It is hereby certified that error appears in the above numbered patent requiring correction and that the said Letters Patent should read as corrected below.

Column 2, line 6, for "qunenched" read -- quenched --; same column 2, lines 39 to 47, in the table, sub-heading to the third column, for "Preferrep Example" read -- Preferred Example --; same column 2, same table, third column, for

| Balance | | Balance |
|---|---|---|
| 0.53 | | 0.35 |
| 0.05 | read | 0.50 |
| 0.80 | | 0.80 | same column 2, line 71, strike out "do"; column 4, line 48, for "An" read -- A --.

Signed and sealed this 26th day of April 1966.

(SEAL)
Attest:

ERNEST W. SWIDER                      EDWARD J. BRENNER
Attesting Officer                     Commissioner of Patents